United States Patent [19]

Hannan, Jr. et al.

[11] 4,061,797

[45] Dec. 6, 1977

[54] NONCARBONATED, CAFFEINE-CONTAINING FRUIT AND COLA FLAVORED BEVERAGE

[76] Inventors: Harry Hannan, Jr.; Primrose D. Hannan, both of 1007 Pinar Drive, Orlando, Fla. 32807

[21] Appl. No.: 606,833

[22] Filed: Aug. 22, 1975

[51] Int. Cl.² .............................................. A23L 2/26
[52] U.S. Cl. .................................... 426/590; 426/599; 426/650
[58] Field of Search ............... 426/590, 594, 597, 599, 426/650

[56] References Cited

U.S. PATENT DOCUMENTS

| 3,476,571 | 11/1969 | Block et al. ........................... 426/590 |
| 3,525,626 | 8/1970 | Swaine et al. ......................... 426/590 |
| 3,632,354 | 1/1972 | Swaine et al. ......................... 426/590 |

OTHER PUBLICATIONS

Woodroof and Phillips; Beverages: Carbonated and Noncarbonated; p. 172; The Avi Publishing Co., 1974.

*Primary Examiner*—Raymond N. Jones
*Assistant Examiner*—Robert J. Warden
*Attorney, Agent, or Firm*—Duckworth, Hobby & Allen

[57] ABSTRACT

A noncarbonated, caffeine-containing food product having both fruit and cola-type flavoring, wherein the fruit flavor is pronounced with respect to the cola flavor, the beverage including an edible organic acid.

15 Claims, No Drawings

NONCARBONATED, CAFFEINE-CONTAINING FRUIT AND COLA FLAVORED BEVERAGE

BACKGROUND OF THE INVENTION

1. Field of the Invention

The present invention relates to food products, and in particular relates to noncarbonated, caffeine-containing beverages.

2. Description of the Prior Art

Tea and coffee are well known noncarbonated, caffeine-containing beverages, in which the caffeine occurs naturally in the respective food product. Caffeine is also present in the kola nut, and cola-type carbonated beverages which include both cola and pepper flavored drinks are also well known commercial products. These cola-type beverages, in addition to containing water, carbon dioxide and flavoring, ar characterized by containing caffeine, caramel coloring and phosphoric acid as the main acidifying agent. Phosphoric acid is the accepted and recommended acid for cola-type beverages. It imparts a flat sourness to the beverage. The so-called "zip" found in carbonated, cola-flavored beverages results from carbonation, or the inclusion of carbon dioxide in the product. Carbon dioxide is thus an essential part of the composition of a carbonated, cola-type beverage. The pleasant taste and aroma in cola-type beverages are directly associated with proper carbonation, and the prior art is clear that, without this inclusion of carbon dioxide, such cola-flavored beverages are flat and unpalatable. See pages 19-22, Beverage Production and Plant Operation, 1955, published by the American Bottlers of Carbonated Beverages, Washington, D.C.

Prior art of interest also includes the following U.S. Pats. Nos. 1,237,723 to Dehls; 775,249 to Roberts; 240,759 to Parrish; 362,728 to Divine; and 1,669,326 to Chalas. In particular, U.S. Pat. No. 3,619,205 to LeVan et al discloses a slush beverage including carbonated water and certain edible food acids, such as malic, tartaric, fumaric and citric acids. Other prior art patents are classified in United States Patent and Trademark Office class 426, subclasses 551, 563, 569 and 590; and in class 171, subclass 315, among others. See also, BEVERAGES: CARBONATED and NONCARBONATED, by Woodroof and Phillips, 1974, AVI Publishing Company, Inc., Westport, Connecticut.

SUMMARY OF THE INVENTION

The present invention contemplates a noncarbonated, caffeine-containing beverage having a cola-type flavoring and including an edible organic acid as an acidulant therein. In a preferred embodiment, the beverage includes a fruit flavor which is pronounced with respect to the cola flavor.

An essential aspect of the present invention is the recognition that certain inorganic acids (notably phosphoric acid) heretofore used as an acid in carbonated cola beverages, causes a flavor imbalance without the presence of sufficient amounts of a carbonating agent. To a lesser extent, a similar flavor imbalance occurs with pepper-flavored beverages. Further, it has been found that deleterious effects to cola-flavoring due to prolonged storage and other factors can be avoided by the addition of a flavor-enriching ingredient, preferably a benzaldehyde-containing additive, such as oil of bitter almond.

DETAILED DESCRIPTION

Several examples embodying the present invention are set forth next.

EXAMPLE ONE

Preferred Embodiment

A preferred embodiment of a noncarbonated, caffeine containing fruit and cola flavored beverage in accordance with the present invention include the following ingredients in the proportions set forth next:

| Ingredient | Amount | % by Weight |
| --- | --- | --- |
| Sugar | 404 grams | 10.100 |
| Malic acid | 6.0 grams | 0.150 |
| Ascorbic acid | 1.13 grams | 0.029 |
| Phosphoric acid | 0.13 grams | 0.003 |
| Caramel coloring | 12 grams | 0.300 |
| Caffeine | .35 grams | 0.009 |
| Oil of bitter almond | .25 milliliters (ml) | 0.006 |
| Kola nut extract | 0.2 grams | 0.005 |
| Other Cola Flavorings (as described below) | 0.12 grams | 0.003 |
| Fruit juice concentrate: | | |
| Pineapple | 67.6 grams | 1.690 |
| Orange | 13.2 grams | 0.330 |
| Grape | 10.0 grams | 0.250 |
| Water | To make 1 gallon | 87.125 |
| | | 100.00% |

The fruit flavoring in Example One is provided by both the bitter almond and the flavoring of the various fruit juices, and is about 11.35%, by weight. The calculation of the percent level is determined from the amount of fruit juice in the final beverage after dilution with water. Since the juice concentrates are commercial grades which have been concentrated about five fold, then the addition of water to the 2.27% (1.69% plus 0.330% plus .250% = 2.27%) juice concentrate yields about 11.35% of reconstituted juice in the final beverage, and is added to the oil of bitter almond ingredient to provide the desired fruit flavoring.

The other cola flavors of Example One immediately above comprise oil of cassia in an amount of .05 milliliter, lime (terpene less) oil in an amount of 0.1 milliliter and vanilla in an amount of 1.0 milliliter, are dissolved in 10 milliliters of propylene glycol, and this mixture is added in an amunt of 0.1 milliliter per gallon of the beverage mixture.

The beverage resulting from the above mixture has an excellent cola-cherry "bouguet", richness of flavor, and shelf life. While the above-mentioned flavor imbalance caused by the presence of phosphoric acid in cola-type beverages in a noncarbonated environment is not completely understood, the utilization of an edible, organic acid as the main flavor acidulant while reducing significantly the amount of phosphoric acid previously utilized in carbonated cola flavored beverages has been found to avoid the unpalatable results heretofore obtained when attempts have been made to formulate a noncarbonated, cola flavored beverage. The utilization of the oil of bitter almong as a flavor enriching agent serves to further avoid the "flatness" previously experienced in such noncarbonated, cola-flavored beverages. It will also be understood that additional amounts of edible organic acids are included in the fruit juice concentrates; for example, citric acid in the pineapple and orange juices, and tartaric acid in the grape juice. These juices provide additional fruit flavoring as well.

Other examples of formulations in accordance with the present invention are set forth below.

EXAMPLE TWO

A second example of a cola punch beverage in accordance with the present invention is set forth next:

| Ingredient | % by Weight |
|---|---|
| Sugar | 11.35% |
| Citric Acid | 0.04% |
| Phosphoric Acid | 0.09% |
| Monosodium Phosphate | 0.03% |
| Caffeine | 0.01% |
| Caramel coloring | 0.25% |
| Flavoring: | |
| oil of bitter almond | .005 |
| oil of cognac | .0005-.0015 |
| cola flavor | .055 |
| Fruit juice concentrate (as Example One) | 0.23% |
| Water | 87.94 |

The fruit flavoring in the above example is provided by the oils of bitter almond and cognac, and the fruit juice.

It will be understood from the above example that the addition of water to the fruit juice concentrate yields a fruit juice amount of about 1%, by weight, utilizing commercially available fruit juice concentrates. The resulting beverage comprises a palatable, noncarbonated, caffeine containing cola punch.

EXAMPLE THREE

A pineapple-cola beverage in accordance with the present invention was formulated as follows:

| Ingredient | % by Weight |
|---|---|
| Sugar | 7.56% |
| Citric Acid | 0.087% |
| Ascorbic Acid | 0.01% |
| Caramel coloring | 0.32% |
| Caffeine-containing cola flavoring | 0.04% |
| Concentrated pineapple juice | 6.87% |
| Water | 85.06% |

The resulting formulation provided a pleasing, noncarbonated, caffeine containing pineapple-cola beverage. The fruit flavoring in Example Three is provided by the 34.35% pineapple juice ingredient. This 34.35% fruit flavoring amount is provided after reconstitution of the five fold 6.87% juice concentrate.

EXAMPLE FOUR

A cola beverage formulation in accordance with the present invention in set forth next:

| Ingredient | % by Weight |
|---|---|
| Sugar | 10.09% |
| Malic Acid | 0.13% |
| Phosphoric Acid | 0.01% |
| Monosodium Phosphate | 0.03% |
| Caffeine | 0.01% |
| Caramel coloring | 0.30% |
| Flavoring: | |
| Oil of bitter almond | trace-.0015 |
| Cola flavor | 0.05 |
| Concentrated fruit juices(as in Example One) | 2.29% |
| Water | 87.09 |

The resulting formulation provided a palatable, caffeine-containing noncarbonated cola beverage having a fruit flavor that was nearly balanced with respect to the cola flavored contained therein. The fruit juice level of this formulation was about 10%, taking into account the amount of water added as the balance thereof.

EXAMPLE FIVE

A fifth example of a noncarbonated, caffeine pepper flavored beverage in accordance with the present invention is set forth below:

| Ingredient | % by Weight |
|---|---|
| Sugar | 10.02% |
| Fumaric Acid | 0.09% |
| Lactic Acid | 0.01% |
| Ascorbic Acid | 0.02% |
| Caffeine | 0.01% |
| Caramel Coloring | 0.30% |
| Flavoring: | |
| oil of bitter almond | 0.005% |
| plant extracts | 0.035% |
| essential oils | trace |
| Fruit Juice Concentrate | 2.53% |
| Water | 86.98% |

The resulting formulation provided a palatable, pepper flavored beverage which was noncarbonated but included caffeine. The fruit juice level in this formulation is about 10%.

EXAMPLE SIX

| Ingredient | % by Weight |
|---|---|
| Sugar | 10.36% |
| Malic Acid | 0.07% |
| Phosphoric Acid | 0.05% |
| Acetic Acid | 0.02% |
| Caffeine | 0.01 |
| Caramel Flavoring | 0.30 |
| Flavoring: | |
| oil of bitter almond | trace |
| cola flavor | 0.06% |
| Concentrated fruit juice: | |
| pineapple orange | 1.26 |
| Water | 87.87 |
| | 100.00% |

The resulting formulation provides a noncarbonated, caffeine-containing cola beverage having about a 5% fruit juice content. Acetic acid is an edible organic acid which in small amounts as set forth above, provides a pleasing, volatile aroma.

EXAMPLES SEVEN-TEN

In addition to the liquid beverages discussed above with respect to Examples one-five, it has been found that the food product in accordance with the present invention is also capable of being formulated as a dry mix, such that the addition of water thereto provides a noncarbonated, caffeine containing fruit and cola flavored beverage. Examples seven-ten below set forth specific formulations of such dry mixes:

| | Ex. 7 | Ex. 8 | Ex. 9 | Ex. 10 |
|---|---|---|---|---|
| Flavor: | Lemon cola | cherry cola | cherry cola | Orange Cola |
| Ingredient: Percentage by Weight | | | | |
| Sugar | 95.07 | 96.62 | 96.87 | — |
| Citric acid | 1.92 | 1.51 | 1.41 | 15.46 |
| Ascorbic acid | 0.24 | 0.13 | — | 2.33 |
| Caffeine | 0.09 | 0.08 | — | — |
| Monosodium Phosphate Modified | 0.15 | 0.22 | 0.25 | 1.40 |

-continued

|  | Ex. 7 | Ex. 8 | Ex. 9 | Ex. 10 |
|---|---|---|---|---|
| Starch | 0.13 | 0.11 | 0.11 | 2.56 |
| Caramel Coloring | 1.03 | 0.99 | 0.99 | 10.80 |
| Flavoring | 0.41 | 0.34 | 0.37 | 2.28 |
| Dehydrated Fruit Juices | 0.96 | — | — | 65.17 |

In order to make one liquid quart of the beverage of Example 7, 104.4 grams of the formulation shown in Example 7 above is added to sufficient water to complete the quart. In Example 8, 115.6 grams of the formulation shown above is added with water to complete a quart amount. In example 9, 114.8 grams of the formulation shown above is added with water to complete a quart. In example 10, 10.7 grams of the formulation is added with 113.5 grams of sugar and with sufficient water to complete a quart.

It will also be understood to those skilled in the food nutrition field that other formulations, or variations in the above-noted formulations may be made without departing from the spirit and scope of the present invention, which is set forth in the following claims.

It will be understood that the term "cola-type flavorings" is intended to include the pepper beverage flavors well known in the art.

I claim:

1. An aqueous, storage stable, noncarbonated, caffeine-containing beverage consisting essentially of fruit and cola flavoring and an edible acid, said fruit flavoring consisting of a concentrated fruit-flavoring in an effective amount by weight or a fruit juice in an amount between about 6.3-34.35% by weight, said fruit flavoring being added to overcome the unpalatable constituents of said cola flavoring, said amount of fruit flavoring being less than an amount which overcomes said cola flavoring so as to render a palatable, noncarbonated beverage having a distinct fruit and cola flavoring.

2. An aqueous, storage stable, noncarbonated, caffeine-containing beverage as recited in claim 1 wherein said edible acid comprises an organic acid.

3. An aqueous, storage stable, noncarbonated, caffeine-containing beverage as recited in claim 2 wherein acid comprises malic acid.

4. An aqueous, storage stable, noncarbonated, caffeine-containing beverage as rected in claim 2 wherein said acid comprises citric acid.

5. An aqueous, storage stable, noncarbonated, caffeine-containing beverage as recited in claim 2 wherein said main acid comprises fumaric acid.

6. An aqueous, storage stable, noncarbonated, caffeine-containing beverage as recited in claim 1 further including a flavor-enriching agent comprising oil of bitter almond.

7. An aqueous, storage stable, noncarbonated, caffeine-containing beverage as recited in claim 1, wherein said fruit flavoring comprises a fruit juice up to about 34.35%, by weight, of said liquid beverage.

8. An aqueous storage stable, a noncarbonated, caffeine-containing beverage as recited in claim 1 wherein said food product is formed from a dry mixture.

9. An aqueous storage stable, noncarbonated, caffeine-containing beverage as recited in claim 8 wherein said dry mixture further includes a flavor-enriching agent comprising oil of bitter almond.

10. An aqueous, storage stable, noncarbonated caffeine-containing beverage recited in claim 1 further including phosphoric acid as a acidulant therein.

11. An aqueous, storage stable, noncarbonated fruit and cola-type flavored beverage including an edible organic acid as a main acidulant therein, and having a caffeine content of less than about 0.01%, a fruit juice content of about 11.35%, oil of bitter almond as a flavor-enriching agent in a content of between trace amounts 0.006%, said percents by weight.

12. An aqueous, storage stable, noncarbonated, fruit and cola flavored beverage as recited in claim 11 further including an anit-oxidant in minor proportions.

13. An aqueous, storage stable, noncarbonated, fruit and cola flavored beverage as recited in claim 12 wherein said anti-oxidant consists essentially of ascorbic acid.

14. An aqueous, storage stable, noncarbonated, fruit and cola flavored beverage as recited in claim 11 further including sugar in an amount of between about 9-14%, by weight.

15. An aqueous, storage stable, noncarbonated, fruit and cola flavored beverage as recited in claim 11 wherein said edible organic acid includes malic acid in an amount of about 0.15% by weight.

* * * * *